(12) United States Patent
Wang

(10) Patent No.: US 10,945,549 B2
(45) Date of Patent: Mar. 16, 2021

(54) COOK MACHINE AND DOUBLE-LOCKING HEAD STRUCTURE OF COOK MACHINE

(71) Applicant: Shenzhen Muren Appliance Co., Ltd., Shenzhen (CN)

(72) Inventor: Wenxiong Wang, Guangdong (CN)

(73) Assignee: Shenzhen Muren Appliance Co., Ltd., Shenzhen (CN)

(*) Notice: Subject to any disclaimer, the term of this patent is extended or adjusted under 35 U.S.C. 154(b) by 250 days.

(21) Appl. No.: 15/978,191

(22) Filed: May 13, 2018

(65) Prior Publication Data
US 2019/0142203 A1 May 16, 2019

(30) Foreign Application Priority Data
Nov. 10, 2017 (CN) .......................... 201721494032.7

(51) Int. Cl.
A47J 27/00 (2006.01)
A47J 43/07 (2006.01)
A47J 43/044 (2006.01)

(52) U.S. Cl.
CPC ............. *A47J 27/002* (2013.01); *A47J 43/07* (2013.01); *A47J 2043/04481* (2013.01)

(58) Field of Classification Search
CPC . A47J 2043/04481; A47J 27/002; A47J 43/07
See application file for complete search history.

(56) References Cited

U.S. PATENT DOCUMENTS

| | | | | |
|---|---|---|---|---|
| 2,054,666 A | * | 9/1936 | Van Guilder | A47J 44/02 366/201 |
| 2,438,465 A | * | 3/1948 | Strauss | A47J 43/044 74/16 |
| 2,462,089 A | * | 2/1949 | Frisbie | A47J 43/044 366/197 |
| 2,789,798 A | * | 4/1957 | Brace | A47J 43/044 366/199 |
| 2,938,715 A | * | 5/1960 | Farrell, Jr. | A47J 43/044 366/200 |
| 4,026,532 A | * | 5/1977 | Madan | A47J 43/044 366/207 |
| 4,070,711 A | * | 1/1978 | Smader | A21C 1/02 366/343 |
| 5,782,558 A | * | 7/1998 | Roberts | A47J 43/044 366/199 |

(Continued)

*Primary Examiner* — Tony G Soohoo

(57) ABSTRACT

The present disclosure discloses a double-locking head structure of a cook machine. The double-locking head structure includes a securing component and a driving component. The securing component includes two securing bases and two bolts. The two bolts are respectively received in two grooves which are respectively defined in a middle portion of the two securing bases. The driving component is configured to drives the two bolts to separate from the two grooves. The present disclosure can fix a main body and a main body of a cook machine or other device by using the two bolts and securing block, thereby improving the fixing effect of the fixing structure, and simultaneously it is convenient to open and close the device are convenient and improve the work efficiency. A cook machine comprising the double-locking head structure is also provided.

20 Claims, 3 Drawing Sheets

(56) References Cited

U.S. PATENT DOCUMENTS

| | | | | |
|---|---|---|---|---|
| 5,957,578 | A * | 9/1999 | Holbrook | A47J 43/0705 366/197 |
| 6,588,930 | B2 * | 7/2003 | Wilson | B01F 7/00583 366/199 |
| 6,761,477 | B2 * | 7/2004 | Hallar | A47J 43/044 366/199 |
| 7,306,362 | B2 * | 12/2007 | Lim | A47J 43/082 366/201 |
| 2010/0313701 | A1 * | 12/2010 | Lu | B01F 7/1615 74/527 |
| 2013/0068055 | A1 * | 3/2013 | Blagotinsek | A47J 47/16 74/96 |
| 2013/0125679 | A1 * | 5/2013 | Blagotinsek | F16H 21/42 74/47 |

* cited by examiner

COOK MACHINE AND DOUBLE-LOCKING HEAD STRUCTURE OF COOK MACHINE

CROSS REFERENCE TO RELATED APPLICATIONS

The present application claims the benefit of Chinese Utility Model Application No. 201721494032.7 filed on Nov. 10, 2017. The above is hereby incorporated by reference.

FIELD

The subject matter herein generally relates to a field of a securing structure, in particular to a double-locking head structure of a cook machine.

BACKGROUND

A kitchenware, such as a cook machine or an agitator, is very popular because it is convenient and quick. These devices are usually provided with an active structure, turn a part of the machine upside down, so that the operator can place and recycle ingredients, load and unload containers, and adjust the mixing angle. These devices usually use motors, which generate a lot of vibrations in the working process. Most of the existing devices use different methods such as lotus leaves and rotating shafts to connect different parts of the devices, because the stress points are relatively single, during a process of switching on the devices and motors, a connection portion is not stable and affects the reliability of the devices.

SUMMARY

The present disclosure aims to overcome the problems existing in the prior art, and the present disclosure provides a double-locking head structure of a cook machine, two points can be used to stabilize different parts of the cook machine and improve reliability in an opening state and a working state.

The purpose of the present disclosure is realized through the following technology:

A double-locking head structure of a cook machine comprises a securing component and a driving component, the securing component comprising two securing bases and two bolts, the two bolts are respectively received in two grooves which are respectively defined in the two securing bases, the driving component is configured to drive the two bolts to separate from the two grooves.

The driving component comprises a pressing bolt and two raising poles, clearance fit is between a root portion of each raising pole and the pressing bolt, an end portion of each raising pole is connected to a top portion of the bolt.

The bolt comprises a bolt body and a short arm, the end portion of each raising pole comprises a carrier, a top portion of the bolt body comprises a protrusion, the short arm is radially arranged on the protrusion, the protrusion passes through a slot defined in a middle portion of the carrier, the carrier is arranged between the short arm and the bolt body.

The pressing bolt comprises a bolt portion, two guide poles, and two pulling handles, the root portion of each raising pole defines a through groove, one end of each guide pole is fixedly connected to the bolt portion, each pulling handle is arranged on the other end of each guide pole, clearance fit is between each pulling handle and the through groove.

Each pulling handle comprises two raising pole shafts and a torsional spring, each raising pole comprises a middle portion, the root portion, the middle portion, and the end portion of the raising pole are fixedly connected in turn, each raising pole shaft is arranged in the middle portion of each raising pole, a part of the torsional spring receives the raising pole shafts, the other part of the torsional spring passes through an upper portion of the protrusion.

A cook machine is also provided. The cook machine comprises the double-locking head structure as mentioned above. The cook machine further a main body, a pedestal, and a connection block, the main body is arranged on the pedestal, the securing base is received in a groove defined in a top portion of the pedestal, one end of the connection block is fixedly connected to the raising pole shaft, the other end of the connection block is fixedly connected to the main body.

The driving component further comprises a rotatable bracket, the rotatable bracket comprises a baseplate and a side plate, clearance fit is between the bolt portion and an opening defined in the side plate, the baseplate resists a bottom portion of the main body.

The pressing bolt further comprises a pressing bolt rotatable shaft, the pressing bolt rotatable shaft is arranged on one end of fixed connection between the guide pole and the bolt portion, the pressing bolt rotatable shaft is rolling-connected with a boss arranged on the rotatable bracket.

A bottom portion of the main body defines an arc-shaped slot, a top portion of the pedestal comprises an arc-shaped protrusion, and the arc-shaped protrusion corresponds to the arc-shaped slot.

Compared with the prior art, the present disclosure improves the fixing effect of the fixed structure by using the two bolts and connection blocks to fix the main body and the pedestal of the cook machine or other similar equipment, and facilitates the opening and closing of the equipment as well as the working efficiency.

BRIEF DESCRIPTION OF THE DRAWINGS

Implementations of the present technology will now be described, by way of example only, with reference to the figures.

DETAILED DESCRIPTION

Figure 1:
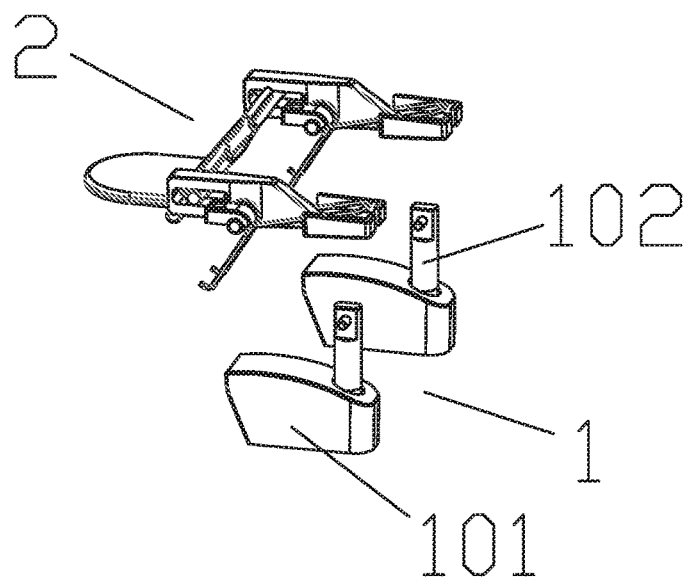
FIG. 1 is a structure diagram of a double-locking head structure of a cook machine.
Figure 2:
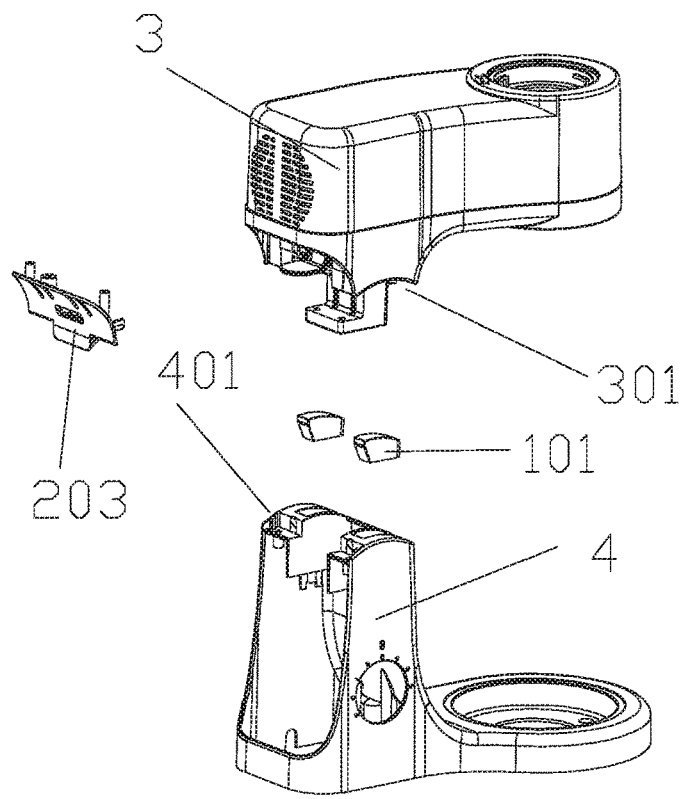
FIG. 2 is a structure diagram of a cook machine.
Figure 3:
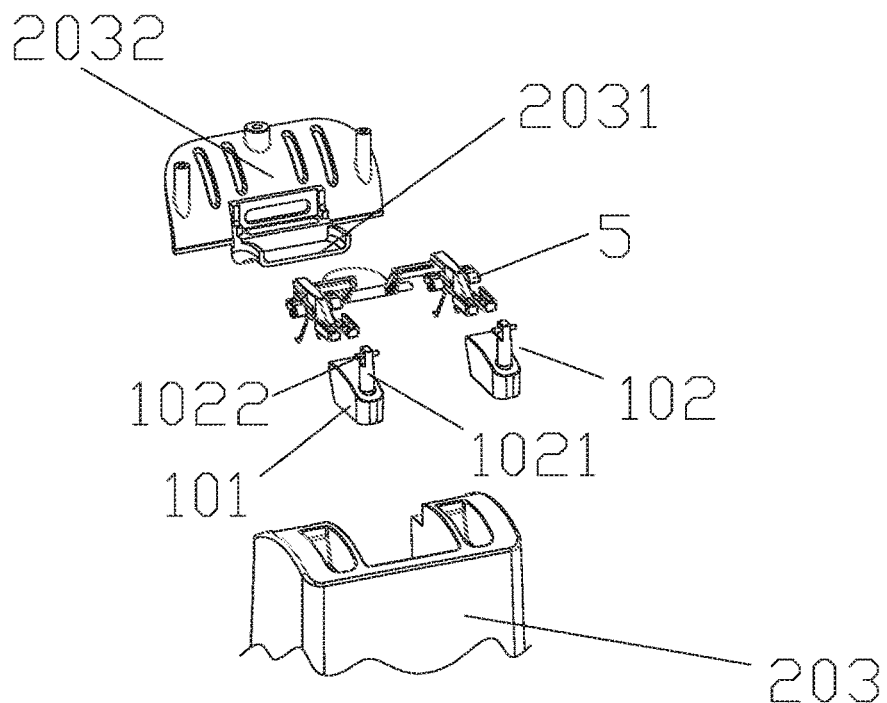
FIG. 3 is a part structure diagram of the double-locking head structure of FIG. 1.
Figure 4:
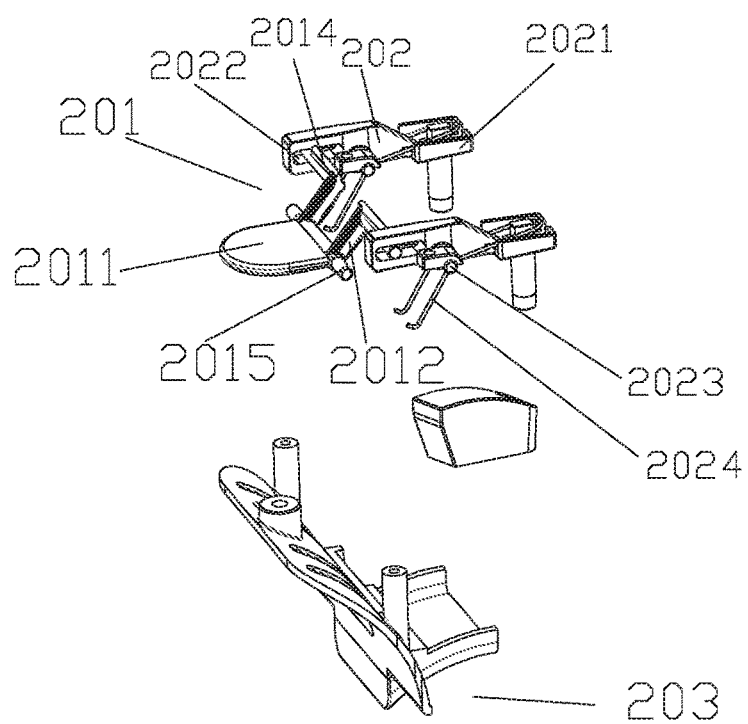
FIG. 4 is another part structure diagram of the double-locking head structure of FIG. 1.
Figure 5:
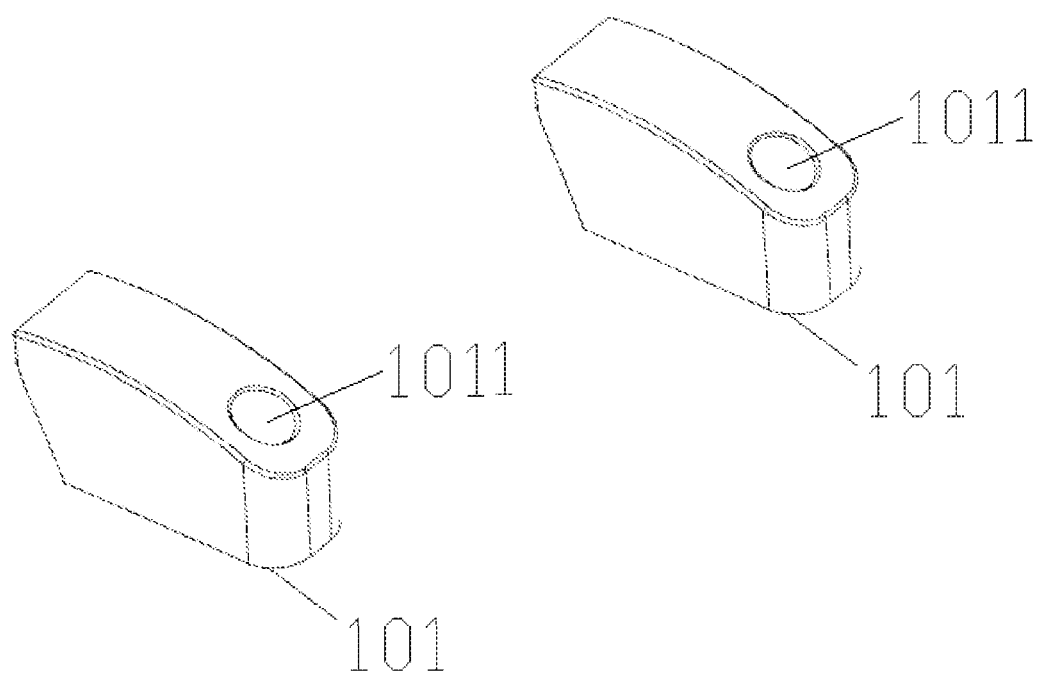
FIG. 5 is a structure diagram of two securing bases.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

FIG. 1 illustrate a double-locking head structure of a cook machine. The double-locking head structure comprises a securing component 1 and a driving component 2. The securing component 1 actively fits the driving component 2. The securing component 1 comprises two securing bases 101 and two bolts 102. The driving component 2 comprises a pressing bolt 201 and two raising poles 202. The two bolts 102 are respectively received in two grooves 1011 which are respectively defined in a middle portion of the two securing bases 101. One end of the bolt 102 actively fits one end of the raising poles 202, and clearance fit is between the other end of each raising pole 202 and the pressing bolt 201.

Specifically, each bolt 102 is received in one corresponding groove. Fix relevant structures in a circumferential direction of the bolt 102, the pressing bolt 201 is driven to rotate by an external force. Raise the raising poles 202, the raising poles 202 drives the bolt 102 to lift, the fixation between the bolt 102 and the securing block is released, the fixation of the relevant structure in circumferential direction of the bolt 102 is released. Two double-locking head structure are used to fix the equipment such as the cook machine, an agitator, or other equipment requiring to opening and closing operations. The locking effect of the structure is enhanced on the vertical surface of the opening and closing action to avoid the tremor caused by only one force point, during the operation of the equipment such as a conventional lotus leaf structure and individual buckle, thereby enabling to improve the performance and longevity of the equipment.

The bolt 102 comprises a bolt body 1021 and a short arm 1022. A top portion of the bolt body 1021 comprises a protrusion. The short arm 1022 is radially arranged on the protrusion. Each raising pole 202 comprises an end portion and a root portion. The end portion of each raising pole 202 is fixedly connected to the root portion of each raising pole 202. The end portion of each raising pole 202 comprises a carrier 2021. The protrusion is located in a slot which is defined in a middle portion of the carrier 2021. The carrier 2021 resists the short arm 1022 in a pulling state and resists the bolt body 1021 in a reverting state.

Specifically, the pressing bolt 201 drives the raising poles 202 to be in a pulling state by an external force, the carrier 2021 pulls the short arm 1022. Lift the bolt 102 until the bolt 102 separates from the groove; the external force on the pressing bolt 201 is removed, the raising poles 202 resists the top portion of the bolt body 1021, to be in a reverting state; the bolt 102 falls back to the through hole to fix the relevant structure, by the gravity and a pressure provided by a falling process of the bolt 102. The present technology uses the top portion of the bolt 102 to set the short arm opposite to the bolt body 1021, to fit the carrier 2021. In a process of the pressing bolt 201 driving the raising poles 202 to lift, the carrier 2021 is mobile below the short arm. Move the short arm 1022, lift the bolt 102, move above the bolt body 1021 in a reverting state, press the bolt body 1021, and press back the bolt 102. Since no rigid connection is involved, the raising poles 202 are free to convert the power generated during the swing into the power required for the up-and-down motion of the bolt 102.

The pressing bolt 201 comprises a bolt portion 2011, two guide poles 2012, and two pulling handles 2014. The root portion of the raising poles 202 defines a through groove 2022. One end of each guide pole 2012 is fixedly connected to the bolt portion 2011. The other end of each guide pole 2012 comprises the pulling handle 2014. Clearance fit is between the pulling handle 2014 and the through groove 2022.

Specifically, the bolt portion 2011 receives an external force and transmits the external force to the pulling handle 2014 by driving the guide pole 2012 to rotate. Drive the pulling handle 2014 to move in the through groove 2022 and press the root portion of the raising poles 202. Lift the raising poles 202. The present disclosure separates the center of the pressing bolt 201 rotary action from the center of the raising pole 202 rotary action, during the transmission process, the raising pole 202 can be arranged to rotate as the center around according to specific requirements. At the same time, set an angle between the guide pole 2012 and the bolt portion 2011, thereby placing the pressing bolt 201 is convenient and providing the structure a stronger torque for easy operation.

The raising poles 202 further comprise a middle portion. The end portion, the middle portion, and the root portion of the raising pole 202 are fixedly connected in turn. The raising poles 202 further comprise a raising pole rotatable shaft 2023 and a torsional spring 2024. The raising pole shaft 2023 is defined in the middle portion. A part of the torsional spring 2024 receives the raising pole shaft 2023, the other part of the torsional spring 2024 passes through an upper portion of the protrusion.

Specifically, in a rotation process of the raising poles 202, the raising pole shaft 2023 acts as an axis of rotary movement of the raising pole 202 by a transmitting force. Adjust the motion range of each raising pole 202 through the setting of the rotating shaft, while setting the torsion spring 2024 on the rotating shaft to provide elastic force in the reverting state to ensure the reset of the bolt 102.

A cook machine comprises the double-locking head structure mentioned as above. The cook machine further comprises a main body 3, a pedestal 4, and a connection block 5. The main body 3 is on an upper portion of the pedestal 4. The securing base 101 is received in the groove defined in a top portion of the pedestal 4. One end of the connection block 5 is fixedly connected to the raising pole shaft 2023, and the other end of the connection block 5 is fixedly connected to the main body 3.

The cook machine with the double-locking head structure, because the double-locking head structure fixes the main body 3 and the pedestal 4 in two origins of force, it is more stable when the main body 3 is turned up and the cook machine is started.

The driving component 2 further comprises a rotatable bracket 203. The rotatable bracket 203 comprises a baseplate 2031 and a side plate 2032. The side plate 2032 defines an opening. The bolt portion 2011 passes through the opening to fit a gap of the opening. The baseplate 2031 resist the bottom portion of the main body 3.

In a process of turning up the cook machine, the baseplate 2031 drags the main body 3 up and assists flip.

The pressing bolt 201 further comprises a pressing bolt hinge 2015. The pressing bolt hinge 2015 is arranged on the guide pole 2012 and on an opposite end of the pulling handle 2014. The pressing bolt hinge 2015 is rolling-connected with a boss arranged on the rotatable bracket 203. Specifically, the pressing bolt 201 rotates at the pivot point of the pressing bolt hinge 2015.

A bottom portion of the main body 3 defines an arc-shaped slot 301. A top portion of the pedestal 4 comprises an arc-shaped protrusion 401. The arc-shaped protrusion 401 corresponds to the arc-shaped slot 301. It is convenient to the main body 3 to turn over.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A double-locking head structure of a cook machine, comprising:
    a securing component comprising two securing bases and two bolts; and
    a driving component;
    wherein the two bolts are respectively received in two grooves which are respectively defined in the two securing bases;
    wherein the driving component is configured to drive the two bolts to separate from the two grooves.

2. The double-locking head structure of claim 1, wherein the driving component comprises a pressing bolt and two raising poles, clearance fit is between a root portion of each raising pole and the pressing bolt, an end portion of each raising pole is connected to a top portion of the bolt.

3. The double-locking head structure of claim 2, wherein the bolt comprises a bolt body and a short arm, the end portion of each raising pole comprises a carrier, a top portion of the bolt body comprises a protrusion, the short arm is radially arranged on the protrusion, the protrusion passes through a slot defined in a middle portion of the carrier, the carrier is arranged between the short arm and the bolt body.

4. The double-locking head structure of claim 3, wherein the pressing bolt comprises a bolt portion, two guide poles, and two pulling handles, the root portion of each raising pole defines a through groove, one end of each guide pole is fixedly connected to the bolt portion, each pulling handle is arranged on the other end of each guide pole, clearance fit is between each pulling handle and the through groove.

5. The double-locking head structure of claim 4, wherein each pulling handle comprises two raising pole shafts and a torsional spring, each raising pole comprises a middle portion, the root portion, the middle portion, and the end portion of the raising pole are fixedly connected in turn, each raising pole shaft is arranged in the middle portion of each raising pole, a part of the torsional spring receives the raising pole shafts, the other part of the torsional spring passes through an upper portion of the protrusion.

6. The double-locking head structure of claim 2, wherein the pressing bolt comprises a bolt portion, two guide poles, and two pulling handles, the root portion of each raising pole defines a through groove, one end of each guide pole is fixedly connected to the bolt portion, each pulling handle is arranged on the other end of each guide pole, clearance fit is between each pulling handle and the through groove.

7. The double-locking head structure of claim 6, wherein each pulling handle comprises two raising pole shafts and a torsional spring, each raising pole comprises a middle portion, the root portion, the middle portion, and the end portion of the raising pole are fixedly connected in turn, each raising pole shaft is arranged in the middle portion of each raising pole, a part of the torsional spring receives the raising pole shafts, the other part of the torsional spring passes through an upper portion of the protrusion.

8. A cook machine comprising the double-locking head structure of claim 1, and further comprising:
    a main body;
    a pedestal; and
    a connection block;
    wherein the main body is arranged on the pedestal, the securing base is received in a groove defined in a top portion of the pedestal, one end of the connection block is fixedly connected to the raising pole shaft, the other end of the connection block is fixedly connected to the main body.

9. The cook machine of claim 8, wherein the driving component further comprises a rotatable bracket, the rotatable bracket comprises a baseplate and a side plate, clearance fit is between the bolt portion and an opening defined in the side plate, the baseplate resists a bottom portion of the main body.

10. The cook machine of claim 8, wherein the pressing bolt further comprises a pressing bolt rotatable shaft, the pressing bolt rotatable shaft is arranged on one end of fixed connection between the guide pole and the bolt portion, the pressing bolt rotatable shaft is rolling-connected with a boss arranged on the rotatable bracket.

11. The cook machine of claim 8, wherein a bottom portion of the main body defines an arc-shaped slot, a top portion of the pedestal comprises an arc-shaped protrusion, and the arc-shaped protrusion corresponds to the arc-shaped slot.

12. A cook machine comprising the double-locking head structure of claim 2, and further comprising:
    a main body;
    a pedestal; and
    a connection block;
    wherein the main body is arranged on the pedestal, the securing base is received in a groove defined in a top portion of the pedestal, one end of the connection block is fixedly connected to the raising pole shaft, the other end of the connection block is fixedly connected to the main body.

13. The cook machine of claim 12, wherein the driving component further comprises a rotatable bracket, the rotatable bracket comprises a baseplate and a side plate, clearance fit is between the bolt portion and an opening defined in the side plate, the baseplate resists a bottom portion of the main body.

14. The cook machine of claim 13, wherein the bolt comprises a bolt body and a short arm, the end portion of each raising pole comprises a carrier, a top portion of the bolt body comprises a protrusion, the short arm is radially arranged on the protrusion, the protrusion passes through a slot defined in a middle portion of the carrier, the carrier is arranged between the short arm and the bolt body.

15. The cook machine of claim 14, wherein the pressing bolt comprises a bolt portion, two guide poles, and two pulling handles, the root portion of each raising pole defines a through groove, one end of each guide pole is fixedly connected to the bolt portion, each pulling handle is arranged on the other end of each guide pole, clearance fit is between each pulling handle and the through groove.

16. The cook machine of claim 15, wherein each pulling handle comprises two raising pole shafts and a torsional spring, each raising pole comprises a middle portion, the root portion, the middle portion, and the end portion of the raising pole are fixedly connected in turn, each raising pole shaft is arranged in the middle portion of each raising pole, a part of the torsional spring receives the raising pole shafts, the other part of the torsional spring passes through an upper portion of the protrusion.

17. The cook machine of claim 12, wherein the pressing bolt comprises a bolt portion, two guide poles, and two pulling handles, the root portion of each raising pole defines a through groove, one end of each guide pole is fixedly connected to the bolt portion, each pulling handle is arranged on the other end of each guide pole, clearance fit is between each pulling handle and the through groove.

18. The cook machine of claim 17, wherein the pressing bolt further comprises a pressing bolt rotatable shaft, the pressing bolt rotatable shaft is arranged on one end of fixed connection between the guide pole and the bolt portion, the pressing bolt rotatable shaft is rolling-connected with a boss arranged on the rotatable bracket.

19. The cook machine of claim 18, wherein each pulling handle comprises two raising pole shafts and a torsional spring, each raising pole comprises a middle portion, the root portion, the middle portion, and the end portion of the raising pole are fixedly connected in turn, each raising pole shaft is arranged in the middle portion of each raising pole, a part of the torsional spring receives the raising pole shafts, the other part of the torsional spring passes through an upper portion of the protrusion.

20. The cook machine of claim 12, wherein a bottom portion of the main body defines an arc-shaped slot, a top portion of the pedestal comprises an arc-shaped protrusion, and the arc-shaped protrusion corresponds to the arc-shaped slot.

* * * * *